United States Patent
Messinger

(10) Patent No.: US 11,656,608 B2
(45) Date of Patent: May 23, 2023

(54) RULE-BASED COMMUNICATING OF EQUIPMENT DATA FROM AN INDUSTRIAL SYSTEM TO AN ANALYSIS SYSTEM USING UNI-DIRECTIONAL INTERFACES

(71) Applicant: ABB Schweiz AG, Baden (CH)

(72) Inventor: Christian Messinger, Ladenburg (DE)

(73) Assignee: ABB Schweiz AG, Baden (CH)

( * ) Notice: Subject to any disclaimer, the term of this patent is extended or adjusted under 35 U.S.C. 154(b) by 104 days.

(21) Appl. No.: 16/584,972

(22) Filed: Sep. 27, 2019

(65) Prior Publication Data
US 2020/0033839 A1    Jan. 30, 2020

Related U.S. Application Data

(63) Continuation of application No. PCT/EP2018/056897, filed on Mar. 19, 2018.

(30) Foreign Application Priority Data

Mar. 31, 2017  (EP) .................................... 17164314

(51) Int. Cl.
*G05B 19/418* (2006.01)
*G05B 19/042* (2006.01)
(Continued)

(52) U.S. Cl.
CPC ..... *G05B 19/4185* (2013.01); *G05B 19/0425* (2013.01); *G05B 19/4183* (2013.01); *H04L 47/36* (2013.01); *H04L 45/10* (2013.01)

(58) Field of Classification Search
CPC ............ G05B 19/0425; G05B 19/4183; G05B 19/4185; H04L 45/10; H04L 47/36; Y02P 90/02; Y02P 90/80
See application file for complete search history.

(56) References Cited

U.S. PATENT DOCUMENTS

2011/0295448 A1   12/2011  Broquet et al.
2013/0031626 A1*   1/2013  Kim .................... H04L 61/1511
                                                        726/22
(Continued)

FOREIGN PATENT DOCUMENTS

WO    WO 2005114364 A1    12/2005

OTHER PUBLICATIONS

"Secure Cross Border Information Sharing Using One-way Data Transfer Systems", Apr. 1, 2009 (Apr. 1, 2009), pp. 1-21, XP055409146.

(Continued)

*Primary Examiner* — Kibrom T Hailu
*Assistant Examiner* — Bao G Nguyen
(74) *Attorney, Agent, or Firm* — Leydig, Voit & Mayer, Ltd.

(57) ABSTRACT

A computer system for communicating with an industrial system includes: a data collection server for receiving equipment data from the industrial system and providing a data stream by pre-processing the equipment data according to a plurality of pre-determined rules; a first uni-directional interface for transmitting the data stream to one or more further computer systems; and a second uni-directional interface for receiving a data packet from the one or more further computer systems, the data packet including a control instruction that allows a modification of at least a particular rule of the plurality of the pre-determined rules. The first uni-directional interface includes a data diode. The second unidirectional interface receives the control instruction in a first part of the data packet. The first uni-directional interface receives the first part of the data packet in a size limitation that corresponds to amounts of data required to identify the modification.

11 Claims, 7 Drawing Sheets

(51) Int. Cl.
*H04L 47/36* (2022.01)
*H04L 45/02* (2022.01)

(56) References Cited

U.S. PATENT DOCUMENTS

| | | | |
|---|---|---|---|
| 2013/0117556 A1 | 5/2013 | Coleman et al. | |
| 2013/0176141 A1* | 7/2013 | LaFrance | G08C 17/02 |
| | | | 340/870.02 |
| 2014/0051380 A1 | 2/2014 | Kleve et al. | |
| 2014/0344886 A1* | 11/2014 | Gillon | H04L 63/205 |
| | | | 726/1 |
| 2014/0372758 A1* | 12/2014 | Agiwal | H04L 63/0876 |
| | | | 713/170 |
| 2016/0212552 A1* | 7/2016 | Schneider | H04L 67/12 |
| 2017/0249285 A1* | 8/2017 | Stewart | G05B 23/0297 |
| 2018/0034682 A1* | 2/2018 | Gulati | G06F 21/572 |
| 2018/0095032 A1* | 4/2018 | Alkadi | G06F 16/29 |
| 2018/0115517 A1* | 4/2018 | Rotvold | H04L 63/0428 |

OTHER PUBLICATIONS

Austin Scott et al: "Tactical Data Diodes in Industrial Automation and Control Systems", May 18, 2015 (May 18, 2015), pp. 1-32, XP055290300.

European Patent Office, Office Action in European Patent Application No. 17164314.1, 8 pp. (dated May 25, 2022).

\* cited by examiner

RULE-BASED COMMUNICATING OF EQUIPMENT DATA FROM AN INDUSTRIAL SYSTEM TO AN ANALYSIS SYSTEM USING UNI-DIRECTIONAL INTERFACES

CROSS-REFERENCE TO PRIOR APPLICATION

This application is a continuation of International Patent Application No. PCT/EP2018/056897, filed on Mar. 19, 2018, which claims priority to European Patent Application No. EP 17164314.1, filed on Mar. 31, 2017. The entire disclosure of both applications is hereby incorporated by reference herein.

FIELD

The description relates to computers in general, and to computers in the context of industrial systems in particular. The description also relates to a method, to a computer program product, and to a computer system.

BACKGROUND

Industrial systems are plants, factories, buildings and the like that comprise technical equipment such as machines, reactors, or vehicles. With the progress of digitalization, almost all pieces of equipment provide data (and use data). Equipment that provides data is collectively referred to as "device".

There are numerous examples for devices. Sensors provide data that represents measurement values for physical phenomena such as temperature, pressure, vibration or the like. Identifiers provide data that identifies equipment by radio tags, by optical codes or otherwise. Devices can be control units such as programmable logic Controllers (PLCs) that interact with equipment, etc.

Data is forwarded to and received from data processing systems such as automation systems and control systems etc.

Data that is processed within an industrial system is referred to as "available data" or "system data".

System data can be processed by one or more analytics systems. The physical locations of the industrial system and the analytics system(s) can be different. Usually, there is a data channel between the plant (i.e. the industrial system) and a computer hosting center (i.e., the analytics system). Such scenarios are frequently called "cloud driven analytics".

However, separating data collection (within the industrial system) and data processing (within the analytics system(s)) creates a number of risks, such as the following: There is a first risk that the analytics systems forward information to non-authorized recipients such as to competitors or to government agencies. The risk has data security aspects. There is a second risk that the analytics system (or any different system) interacts with the industrial system and eventually causes mal-function of the industrial system. There is a third risk that data is transmitted to the "wrong" analytics system. This would result in network traffic, but the receiving system can't analyze the data. In an even worse scenario data would eventually be misused.

Restrictions can mitigate these risks. For example, the analytics system can be prevented from analyzing the system data completely. Data is transmitted from the technical system to the analytics systems only partially, in a subset ("analysis data") of the system data. Data can be transmitted from the technical system to different analytics systems according to particular purposes. For example, first data goes to a system that supports predictive maintenance for equipment, and second data goes to an enterprise resource planning (ERP) system, and so on.

To further mitigate the risks, the industrial system can be connected to the analysis system(s) through one or more sub-systems that provide data pre-processing. Pre-processing can comprise:
- rule-based data selection (i.e., filtering analysis data out of system data),
- rule-based target identification (i.e., addressing data to a particular analytics system),
- data uni-direction (i.e., transmitting to the analysis system only, but not vice versa).

The sub-systems can be implemented, for example, by data collection servers and by so-called data diodes.

However, data pre-processing can lose efficiency and/or effectiveness if some data is missing. In case of uni-directional data transmission, the selection of data and the identification of a target (in the analysis system) can't be modified by the analysis system. In other words, modifying filtering or addressing rules is complicated.

SUMMARY

In an embodiment, the present invention provides a computer system configured to communicate with an industrial system, the computer system comprising: a data collection server configured to receive equipment data from the industrial system and to provide a data stream by pre-processing the equipment data according to a plurality of pre-determined rules; a first uni-directional interface configured to transmit the data stream to one or more further computer systems; and a second uni-directional interface configured to receive a data packet from the one or more further computer systems, the data packet comprising a control instruction that allows a modification of at least a particular rule of the plurality of the pre-determined rules, wherein the first uni-directional interface comprises a data diode, wherein the second unidirectional interface is configured to receive the control instruction in a first part of the data packet, wherein the first uni-directional interface is configured to receive the first part of the data packet in a size limitation that corresponds to amounts of data required to identify the modification of the particular rule, and wherein the size limitation of the first part has an equivalent limitation by the second uni-directional interface that is configured to receive the first part in a maximum size.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
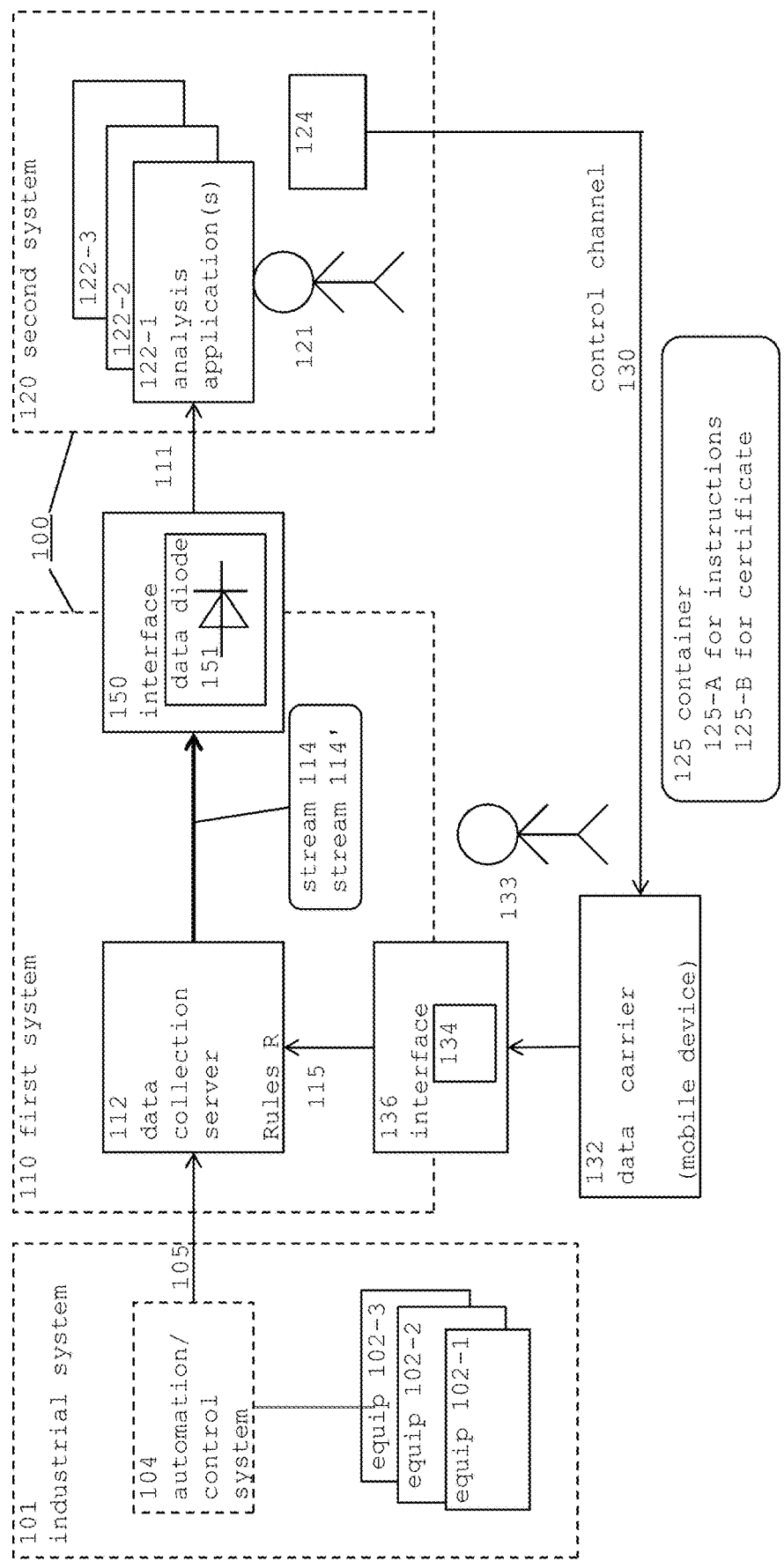
FIG. 1 illustrates a system landscape with a main computer system and a second computer system that are communicatively coupled via first and second uni-directional interfaces to implement data flow in a first data direction and in a second data direction.

According to embodiments of the present invention, a computer system provides a rule-based communication of equipment data from an industrial system to an analysis system. The computer system transmits equipment data through a first uni-directional interface in a first data direction, but also receives rule modifications through a second uni-directional interface. This approach makes it possible to modify the rules, at least to some extent. The first interface can be implemented with a data diode, and the second interface can be implemented by an air-gap for interaction with a mobile data carrier (that is not part of the system). Metaphorically, the gap has to be crossed but crossing the gap slows down the communication speed (in terms of volume and bandwidth) so that counter-direction communication is minimized to changing rules. The mobile data carrier provides instructions that allow the modification of the rules. This approach mitigates the above-mentioned risks by substantially keeping the data transmission in one direction in combination with allowing rule modifications in a technically restricted way.

The computer system is adapted to communicate with an industrial system. In the computer system, a data collection server is adapted to receive equipment data from the industrial system and to provide a data stream by pre-processing the equipment data according to a plurality of pre-determined rules. In the computer system, a first uni-directional interface is adapted to transmit the data stream to one or more further computer systems—the analysis systems—but to prevent the reception of data from any further computer systems. In the computer system, a second uni-directional interface is adapted to receive a data packet from the (one or more) further computer systems. The data packet comprises a control instruction that allows the modification of at least a particular rule of the plurality of the pre-determined rules.

In an embodiment, the first uni-directional interface can be implemented with a data diode. The second uni-directional interface can be implemented to receive the control instruction in a first part of the data packet. The first part of the data packet can have a size that corresponds to the amount of data required to identify the modification of the particular rule. The second uni-directional interface (or the data collection server) can be adapted to receive the first part of the data packet in that size (within pre-defined tolerances). This avoids receiving instructions that could further modify the operation of the data collection server.

In further embodiments, the second uni-directional interface receives the data packet from a mobile data carrier that is communicatively coupled to the further computer system, wherein the second uni-directional interface can comprises an optical sensor to receive the data packet via an optical code from the mobile data carrier. Alternatively, an acoustical sensor may be used to receive the data packet via a sequence of acoustical codes from a loudspeaker of a mobile device.

The collection server can be adapted to receive the control instruction in combination with a certificate that is identified in a second part of the data packet so that the further computer system can be authenticated.

A computer-implemented method and a computer program product are provided accordingly. The computer program product—when loaded into a memory of a computer and being executed by at least one processor of the computer—performs the steps of the computer-implemented method.

FIG. 1 illustrates system landscape 100 with first computer system 110 (or main computer system) and second computer system 120 (or analysis system). Both systems 110 and 120 are communicatively coupled via first uni-directional interface 150 and second uni-directional interface 136. Interface 150 implements data flow in a first data direction and interface 136 implements data flow in a second data direction. The directions are opposite to each other. To put the operation of computer systems 110 and 120 into context, FIG. 1 also symbolizes industrial system 101 with equipment 102-1, 102-2, 102-3 (collectively equipment 102) that supplies equipment data 105. In many cases, equipment data 105 is supplied via automation-and-control system 104. Equipment data 105 can correspond to the above-mentioned system data, but equipment data 105 is frequently a sub-set of the system data.

Main computer system 110 comprises data collection server 112 and interfaces 150 and 136. Analysis system 120 comprises one or more analysis applications 122-1, 122-2, 122-3 (collectively analysis application 122). Optionally, system 120 comprises user interface 124 for first user 121. System 120 can also be regarded as an "analysis system".

FIG. 1 illustrates a main data transmission direction (i.e., the first data direction) from left to right, that is from automation-and-control system 104 to analysis application 122 (in system 120). The main data transmission direction can also be seen as data export direction (i.e., data leaving the industrial system). In operation, data collection server 112 receives equipment data 105 from industrial system 101 (e.g., via system 104), pre-processes equipment data 105 according to a plurality of pre-defined rules R and thereby provides data stream 114. The rules R can be identified by index n, and in the example, there are N rules (R1 to RN).

The rules are related to actions, such as for example: (a) selection rules (to distinguish equipment data to be transmitted by the data stream from equipment data to be blocked from the data stream), (b) address rules (to let the data stream carry equipment data to a particular analysis application, optionally (with higher granularity) to a particular data base table or to other target inside the identified application, etc.), (c) security rules (to apply particular checks prior to transmitting, to apply a particular encryption of equipment data, etc.).

Rules R can have rule components and rule attributes, the rule components identify equipment data and potential actions, and the rule attributes identify particular actions. The description uses a simplified example of rule Rk that is a selection rule that distinguishes equipment data from three sensors (component, with identification and potential action). In a first rule attribute set, data of two particular sensors (T, P) is transmitted, and in a second rule attribute set, data of all three sensors (T, P, V) is transmitted.

Data stream 114 is a sequence of data packages (with equipment data after pre-processing) addressed to particular analysis applications 122-1, 122-2 or 122-3. Interface 150 is a uni-directional interface that allows data transmission in one direction only (main direction), but that prevents data transmission in the opposite direction. Interface 150 can be implemented with data diode 151. In operation, interface 150 transmits data stream 114 to analysis system 120 (or to other systems, not illustrated) via an inter-system channel 111 (e.g., via a wide area network such as the internet or an intra-net, via leased lines etc.). In other words, interface 150 allows data to leave system 110 but prevents the reception of data from system 120 (or from any further computer systems).

FIG. 1 illustrates a control data transmission direction (i.e., the second data direction) from right to left, that is from analysis system 120 to main computer system 110 (but not to industrial system 101). Data being transmitted in the second direction comprises control instruction 115 that allow the modification of at least a particular rule Rk (of the plurality of pre-defined rules). The modification of Rk can comprise the modification of the rule components, of the rule attributes, or of both the components and the attributes.

Transmitting control instruction 115 uses control channel 130 (that is different from inter-system channel 111). Control channel 130 uses hardware that is different (and separate) from the hardware in channel 111. In main computer system 110, uni-directional interface 136 is communicatively coupled to data collection server 112. In operation, interface 136 receives data packet 125 that comprises control instructions 115.

Data packet 125 comprises a first part 125-A with control instruction 115 and—optionally—comprises a second part 125-B with overhead data (or meta-data) such as a certificate. Looking at the size of first part 125-A, that is the amount measured in bytes, first part 125-A has a size that corresponds to the size of control instruction 115. In a minimal version, the size of first part 125-A corresponds to the number of bytes that are required to convey the modification of particular rule Rk. As the person of skill in the art understands, the instruction comprises code that identifies the rule (i.e., an integer for the variable k), code to identify particular equipment data, and code to identify a particular change for the rule (e.g., switching from blocking data to forwarding data). In a further version, the size of first part 125-A is sufficiently large to convey the modification of two rules. The size limitation mitigates the risk of inserting code to main computer system 110. Thereby the above-mentioned risks can be reduced, for example, because of the limited ability of industrial system 101 or of DCS 112 to transmit data without complying to rules.

The size limitation of first part 125-A can have an equivalent limitation by interface 136 (or by DCS 112) that can be adapted to receive first part 125-A in a maximum size (within pre-defined tolerances). The maximum size can depend on a type of instruction (e.g., a size constraint for one rule modification, for a given number of rule modifications in a single instruction etc.). This measure avoids receiving instructions (or even hazardous software) that could further modify the operation of the data collection server.

In case that rule Rk is modified, data stream 114 becomes (modified) data stream 114'. Depending on the rule modification, stream 114' can convey more data than stream 114, or less data. An example will be explained in connection with FIG. 3 (data from one sensor added).

Control channel 130 is not part of system 110 and not part of system 120, but uses hardware that is not part of the systems.

To illustrate this different hardware approach, FIG. 1 illustrates interface 136 to comprise sensor 134 that receives input from mobile data carrier 132 (e.g. from a mobile device). Sensor 134 and carrier 132 communicate via an "air gap". Since data carrier 132 is mobile, it can be moved into proximity of sensor 134 by a human user, such as technician 133 who works at the industrial site. It is noted that physical access restrictions to humans at the entrance of the industrial site may add further security, in a synergetic way. As used herein, proximity is the physical distance between sensor 134 and carrier 132 for that carrier-to-sensor communication is possible.

Figure 2:
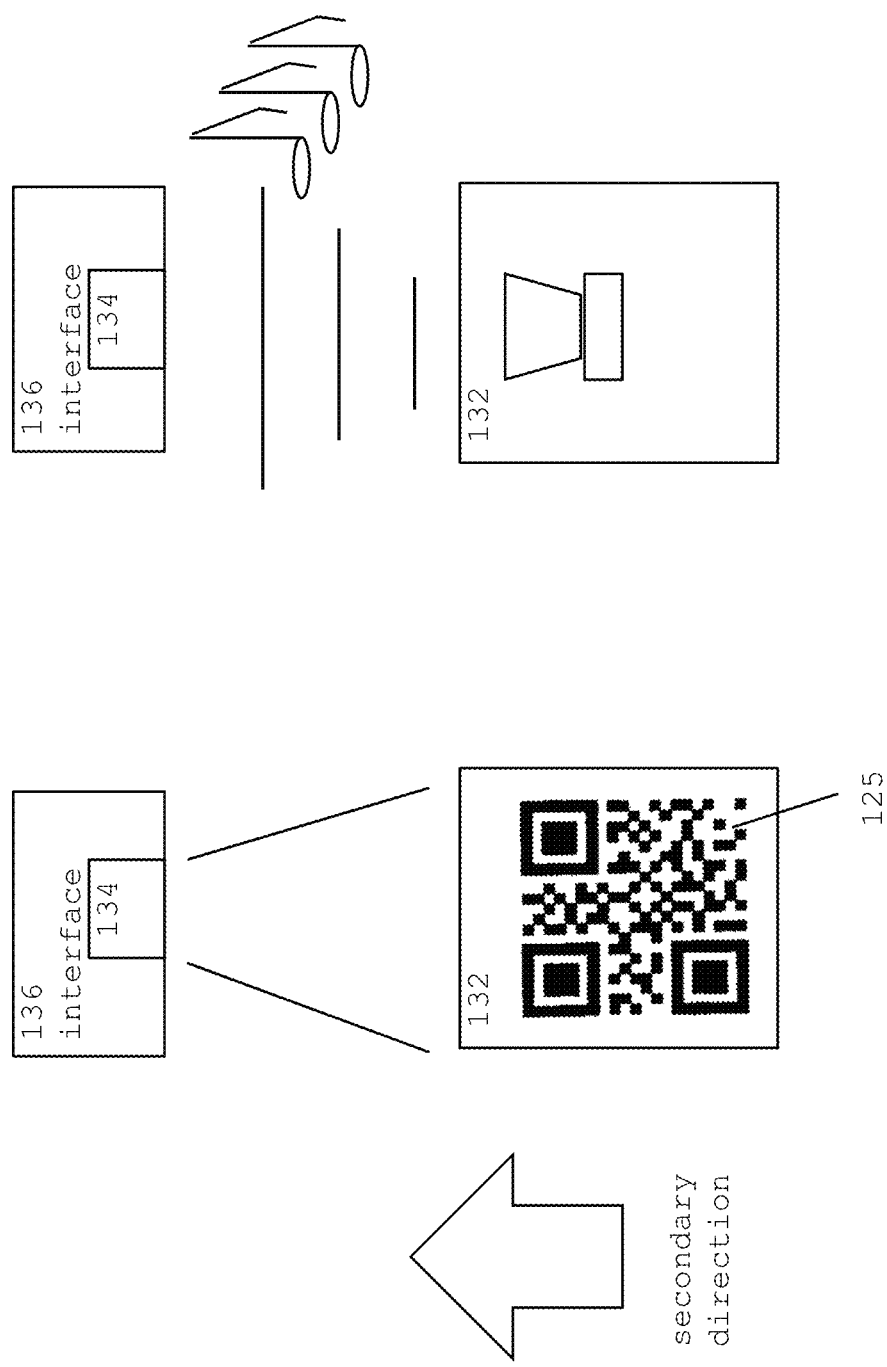
FIG. 2 illustrates communication from the second computer system to the first computer system in the second data direction, with a sensor that belongs to the second uni-directional interface and that receives input from a mobile data carrier.

FIG. 2 illustrates communication from analysis system 120 to main computer system 110 in the second data direction: sensor 134 (belonging to interface 136) receives input from data carrier 132.

In a first embodiment (illustrated on the left side), sensor 134 is an optical sensor that is adapted to receive data packet 125 via an optical code. Such code comprises bar-codes, QR-codes (i.e., quick response codes), code in form of text characters, or other codes, etc. De-coders are known in the art, among them bar-code readers, QR-code readers, optical character recognition (OCR) and so on. The optical code is provided from analysis system 120 (cf. FIG. 1).

In a first example (of this first embodiment), analysis system 120 (cf. FIG. 1) sends data packet 125 to a mobile device (i.e., a "smartphone") that displays the optical code on its screen. The mobile device acts as data carrier. It does not matter, if the coding is being performed by the mobile device, by analysis system 120, or by an intermediate system. Depending on (further) security requirements, the person of skill in the art can optimize this. For example, coding at system 120 potentially provides the highest protection level against attacks.

In a second example (of this first embodiment), system 120 sends data packet 125 with the optical code on paper. Transporting the paper is possible. Using facsimile is also possible.

In a second embodiment (illustrated on the right side), sensor 134 is an acoustical sensor (i.e., a microphone) that receives the code as a sequence of sounds (symbolized by musical notation).

In a first example (of this second embodiment), the sound is provided from the loudspeaker of the mobile device. Communicating information that is converted to sound is state of the art technology. The person of skill in the art can select a suitable approach (e.g., storing the sound as an audio file such as mp3 on the mobile device, streaming the sound without storing a file). Similar as in the above embodiment, the coding to sound can be performed by the mobile device, by analysis system 120 or otherwise.

In a second example (of this second embodiment), the sound is provided from a land-line phone.

In a third example (of this second embodiment), the sound is provided as a spoken message from the user who recites a text that he/she receives from analysis system 120. In that case, the user would simply carry data without mentally interacting. For those of skill in the art, speech recognition is available for integration into interface 136.

In a third embodiment, sensor 134 is a keyboard (or other input device, not illustrated) that receives the code in the form of alpha-numeric characters. The code can be transmitted to a (human) user through a mobile device, through a traditional voice phone, etc. It is noted that the code can comprise redundancies to compensate for human errors while reading and typing. Mental interaction by the user is not part of this code transmission. In other words, the human user enters code that he/she received, without extra code and without leaving code out.

The embodiments (of the sensor) can be combined, for example in a combination of optical and acoustical codes. As mentioned above, the size (of data packet 125) is limited, but in case that the size does not fit to a single page (of screen, or paper), the code can be transmitted as a sequence of code portions (e.g., in the form of a video).

Further security measures can be implemented in combination. For example, streaming allows the transmission of code (optical or acoustical code) at a particular point in time.

The approach with sensor 134 in interface 136 de-couples intra-system channel 111 from control channel 130. There is still a risk that unauthorized control instructions 115 (in packets 125) could modify the rules. The following explanation describes an embodiment in that the second part 125-B of data packet 125 conveys certificate data so that the sender of control instructions 115 (i.e., analysis system 120) can be authenticated.

Using cryptography is well known to authenticate the sender of a message, to provide data confidentiality, data integrity, and other security purposes. As used herein, the term "certificate" summarizes digital certificates (or "identity certificate") that are communicated from second computer (analysis) system 120 (the sender) in data packet 125 (the message) to DCS 112. The certificates can use keys (public and private key). Certificates are defined in standards, such as in the X.509 standard (International Telecommunications Union's Standardization sector ITU-T, also available as ISO/IEC 9594-8 October 2016). To follow the principle of data limitation, the person of skill in the art can take suitable definitions in the standards. There is no need to implement the certificates with each and every detail of the standard.

In an embodiment it is sufficient to use the certificate for the purpose of authentication. Other purposes such as data confidentiality and data integrity (of the instructions) are of lower significance (the instructions to not convey data, incorrect instructions would fail to modify the rules, but the DCS can keep backups). Focusing on the authentication allows saving bytes in packet 125.

Looking at the rules, data collection server 112 can be adapted to pre-process equipment data 105 according to pre-determined rules that are selection rules to provide the data stream as a sub-set of equipment data. In other words, the rules can be filtering rules. In an alternative (or in addition to that), data collection server 112 can be adapted to pre-process equipment data 105 according to pre-determined rules that are identification rules to provide data stream 114 with identifiers (or addresses). This approach allows selective data transmission to different further computer systems, or to allow selective data transmission to different applications (cf. 122-1, 122-2, or 122-3 in FIG. 1) in analysis system 120.

Those of skill in that art can implement other rules and appropriate modification instructions. For example, rules can be sensitive to data events. For example, an event-driven rule checks if equipment data 105 represents predefined events (in industrial system 101, such as threshold events) and can add or remove data from the data stream. Such event-driven rules can be modified through instructions as well. In a further example, the rules are security rules. Pre-processing can comprise to encrypt data before transmitting it in the data stream. Rule modifications can change the encryption, for example, by disabling encryption, by changing a key or the like.

Figure 3:
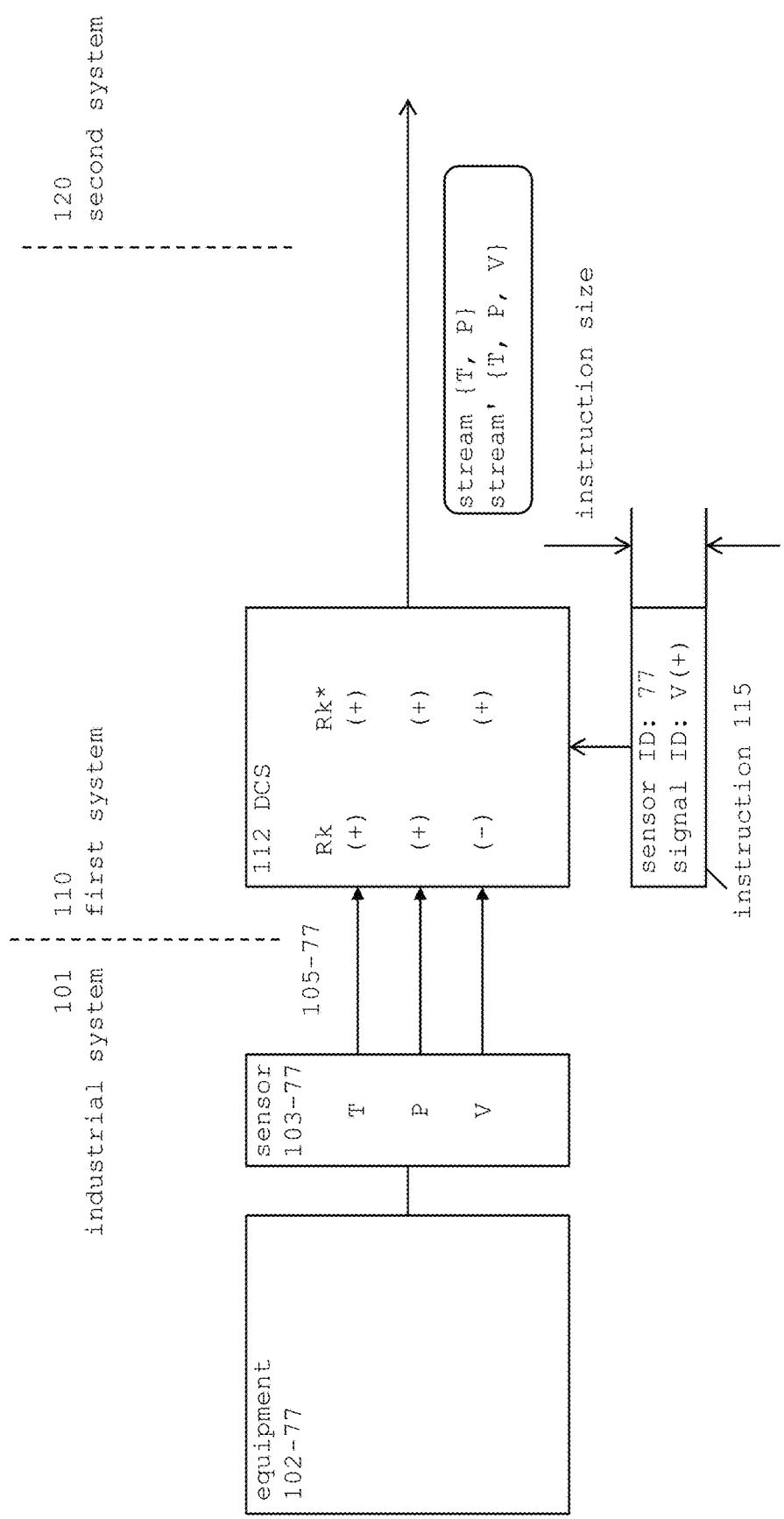
FIG. 3 illustrates details with a particular piece of equipment and a particular sensor that provides equipment data in the industrial system, in combination with the data collection server in the main computer system receiving a control instruction.

FIG. 3 illustrates details with particular equipment 102-77, sensor 103-77 that provides equipment data 105-77 in industrial system 101, in combination with data collection server (DCS) 112 in main computer system 110. DCS 112 receives control instruction 115 (via packet 125, cf. FIG. 1). The number "77" a simplified identifier used herein for illustration. The number was chosen at random.

In the example, equipment 102-77 is a machine with sensor 103-77 that provides measurement data for physical phenomena such as temperature T, pressure P, and vibration V. There could be continuous data availability or—more likely in the digital world—the availability of data at regular intervals (e.g., new data every minute). The measurement data is a vector being equipment data 105-77 (T, P, V). According to pre-defined rule Rk—being a selection rule—DCS 112 forwards T and P (from particular sensor 77) to stream 114 (cf. FIG. 1), but does not forward V. (In the figure, the rule attributes are illustrated by (+) and (−) symbols).

It is assumed that first user 121 (cf. FIG. 1) needs to track the vibration V (of that machine 77). There might be an underlying reason for that need, such as increased temperature, but this is not relevant here. First user 121 interacts with interface 124 (in analysis system 120) to provide control instruction 115. In the example, instruction 115 identifies particular equipment data 105-77 and identifies the part of the rule that has to be changed. In the example, only the attributes need to be changed: setting V to (+). The number of bytes to convey this instruction (instruction size) fits to the size of 125-A (in data packet 125).

DCS 112 receiving instruction 115 (via control channel 130, as described above) changes the rule

| Rk (component)    | T   | P   | V   | identification "77" |
|-------------------|-----|-----|-----|---------------------|
| from attribute set | (+) | (+) | (−) |                     |
| to attribute set   | (+) | (+) | (+).|                     |

As a consequence, next available particular equipment data 105-77 (in the next minute) is forwarded to the stream, with T, P and V.

The instruction size can be calculated, for example by summing up the following: the number of bytes to identify Rule Rk (e.g., 1 Byte if N=512), the number of bytes to identify the sensor (e.g., 2 Bytes), the new attribute set (e.g., 3 bytes), meta-data (overhead)

In the example of FIG. 3, the rule component remains unchanged. In other words, the rule governs the transmission of T, P, and V from sensors. It can be advantageous to modify the rule attributes only (further saving the size of the instructions).

In case that the rule is an identification rule, data for T, P and V could be addressed to different systems (analysis system 120 or others) or to different applications (inside the analysis system). Rule modification can change this addresses, for example, to re-direct data from one application to other application(s).

Figure 4:
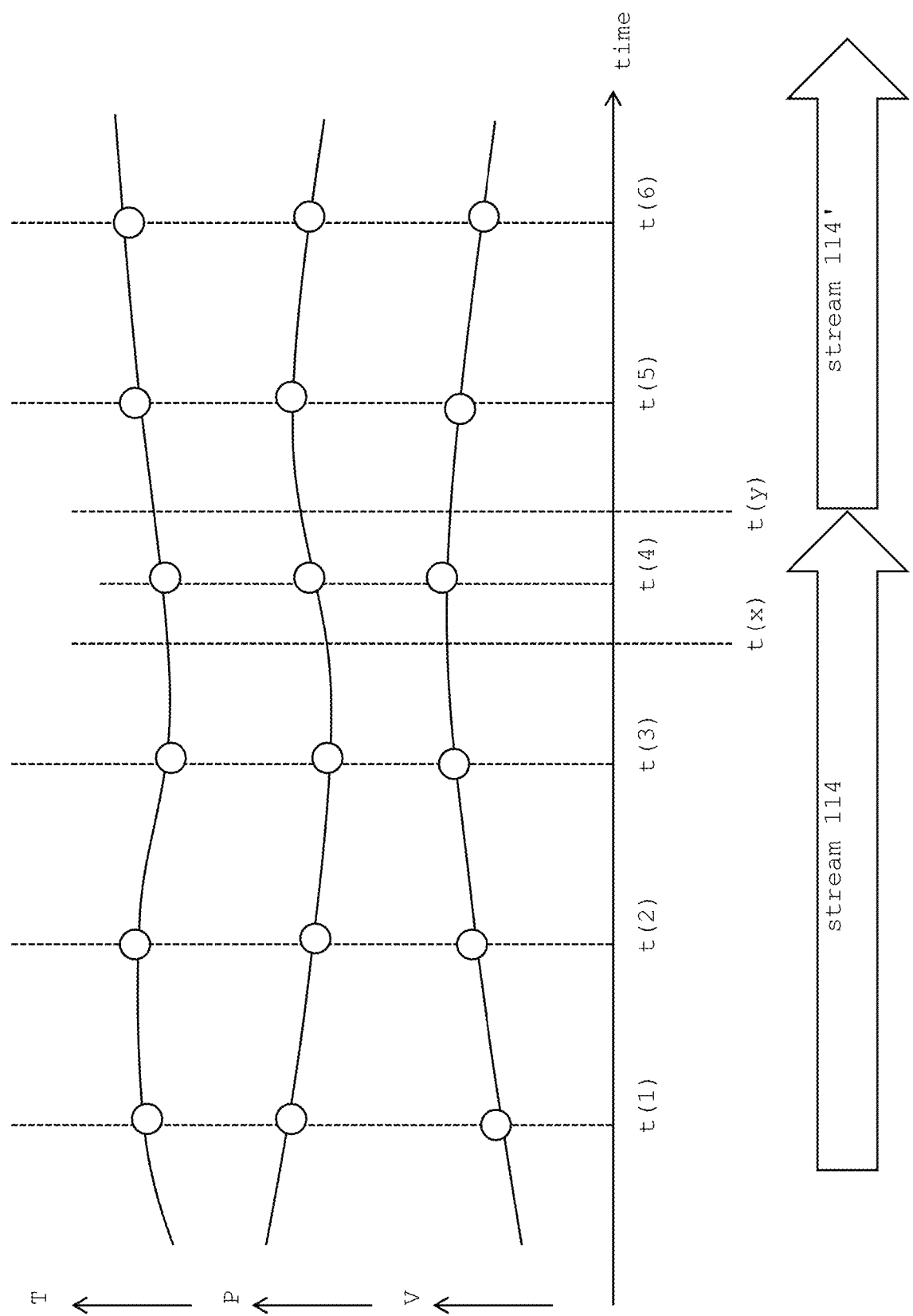
FIG. 4 illustrates a data-to-time diagram of data streams.

FIG. 4 illustrates a data-to-time diagram of data streams 114 and 114' for the example of FIG. 3. In the example, sensor 103-77 provides equipment data 105 by data samples (circle symbols) at consecutive time points t(1), t(2), t(3), . . . , t(6) and so on for T, P and V. Looking at the progress of time, equipment data (105 in FIG. 1) that is available at an earlier time point t(s) is "previous equipment data", and equipment data that is available from the following time point (t(s) is "consecutive equipment data". For simplicity it can be assumed that the sampling time (t(s)–t(s−1)) remains constant (e.g., sampling time being a minute). Data stream 114 comprises the samples for T and P for t(1), t(2), t(3) and t(4) (black circles), but not for V (white circles) due to pre-processing according to original, un-modified rules Rk. From t(x) to t(y), the rules are modified as described, so that new, modified data stream 114' comprises T, P and V (black symbols, from t(5)). The processing time (t(x) to t(x)) it takes DCS 112 to receive data packet 125, to extract instructions 115 (optionally with checking certificates) and to modify the rules can be shorter than the sampling time (as in the example) or can be longer.

Figure 5:
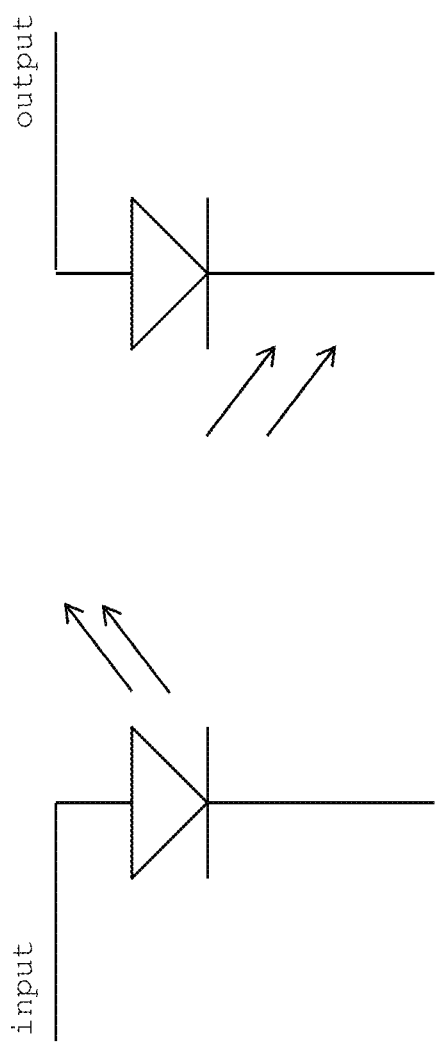
FIG. 5 illustrates a schematic for the first uni-directional interface with a data diode.

FIG. 5 illustrates a schematic for first uni-directional interface that is implemented by hardware. The interface comprises data diode 151 with—for example—one or more light-emitting elements (such as light-emitting diodes LEDs) at the input (i.e., at the output of DCS 112 with steam 114, 114') and by one or more photo elements (photo diodes, photo transistors or other) that lead to inter-system channel 111 (cf. FIG. 1). The elements are symbolized by conventional symbols, with the arrows symbolizing light. Both the LED and the photo diodes are arranged such that light can travel from the LED to the photo element, through optical fibers or otherwise. For simplicity of illustration, details regarding electrical circuitry are left out.

Figure 6:
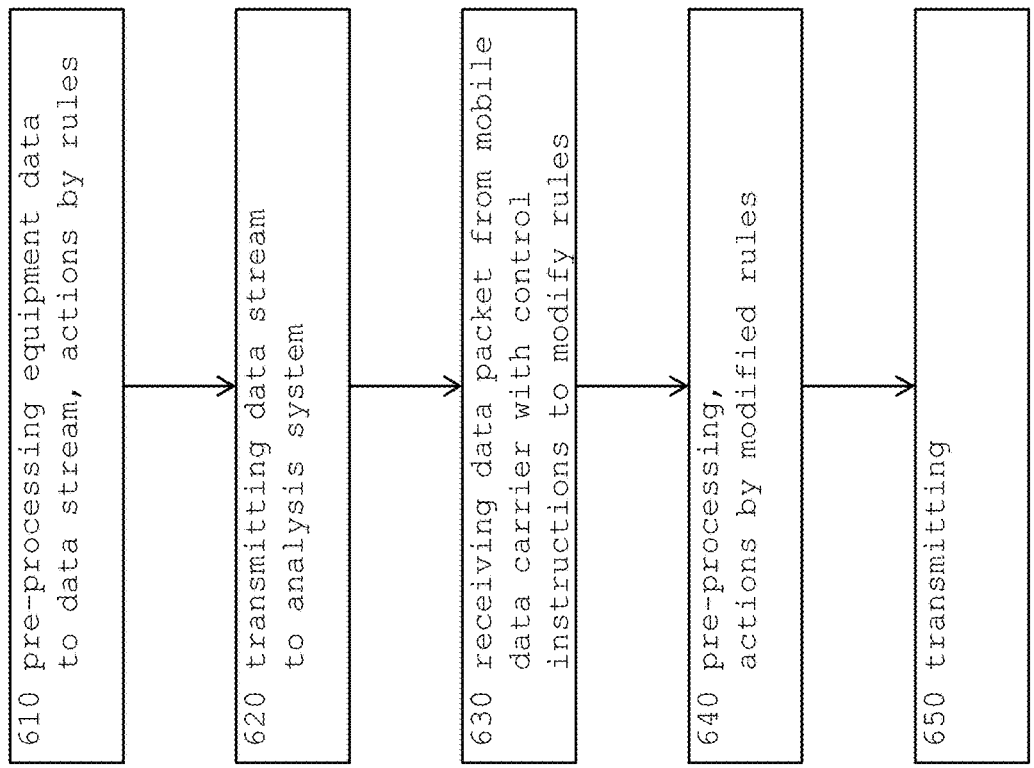
FIG. 6 illustrates a flow-chart diagram of a computer-implemented method for operating a computer system that forwards equipment data from an industrial system to an analysis system.

FIG. 6 illustrates a flow-chart diagram of computer-implemented method 600 for operating computer system 110 that forwards equipment data 105 from industrial system 101 to an analysis system (e.g. system 120).

In a pre-processing step 610, system 110 forwards equipment data 105 from industrial system 101 to data stream 114 according to actions that are selectively activated by a plurality of pre-determined rules (R). As explained above, actions comprise transmitting or blocking, but other actions can be implemented as well, such as storing data in a buffer.

In a transmitting step 620, system 110 transmits data stream 114 to analysis system 120 through first uni-directional interface 150 (of computer system 110).

In a receiving step 630, system 110 receives data packet 125 from analysis system 120, by interacting with mobile data carrier 132 and second uni-directional interface 136. Data packet 125 comprises control instructions 115 that allow the modification of at least a particular rule Rk of the plurality of pre-determined rules. This has been described in detail above.

In a pre-processing step 640, system 110 applies the modified rules. System 110 pre-processes consecutive equipment data 105 according to actions that are selectively activated by the modified rules. In a transmitting step 650, system 110 transmits modified data stream 114'. Steps 640 and 650 can be considered as repetition of previous steps 610 and 620, but applied to new equipment data 105.

Optionally, in step receiving 630, system 110 receives data packet 125 with a first part 125-A that comprises control instructions 115 in a size that allows to modify the at least one particular rule Rk. Receiving can comprise limiting the size by that instructions are being received. In other words, this would be a further measure to ensure the reception of the control instruction (without further code that potentially could act on system 110 in an non-desired way).

Optionally, the size limitation can be related to receiving 630 first part 125-A to comprise control instructions 115 in a size that allows to modify an attribute set (of the at least one particular rule). As explained above by the example of FIG. 3, it can be sufficient to receive instructions that modify the attribute set only, but that do not change the rule component.

Optionally, computer system 110 can receive packet 125 with second part 125-B having a certificate. The certificate allows computer system 110 to authenticate the origin of the data packet 125.

FIG. 6 also illustrates a computer program or a computer program product. The computer program product—when loaded into a memory of a computer and being executed by at least one processor of the computer—performs the steps of the computer-implemented method. So in other words, the blocks in FIG. 6 illustrate that the method can be implemented by a computer under the control of the program. The same principle applies to the processing blocks that are explained in connection with FIG. 1.

Figure 7:
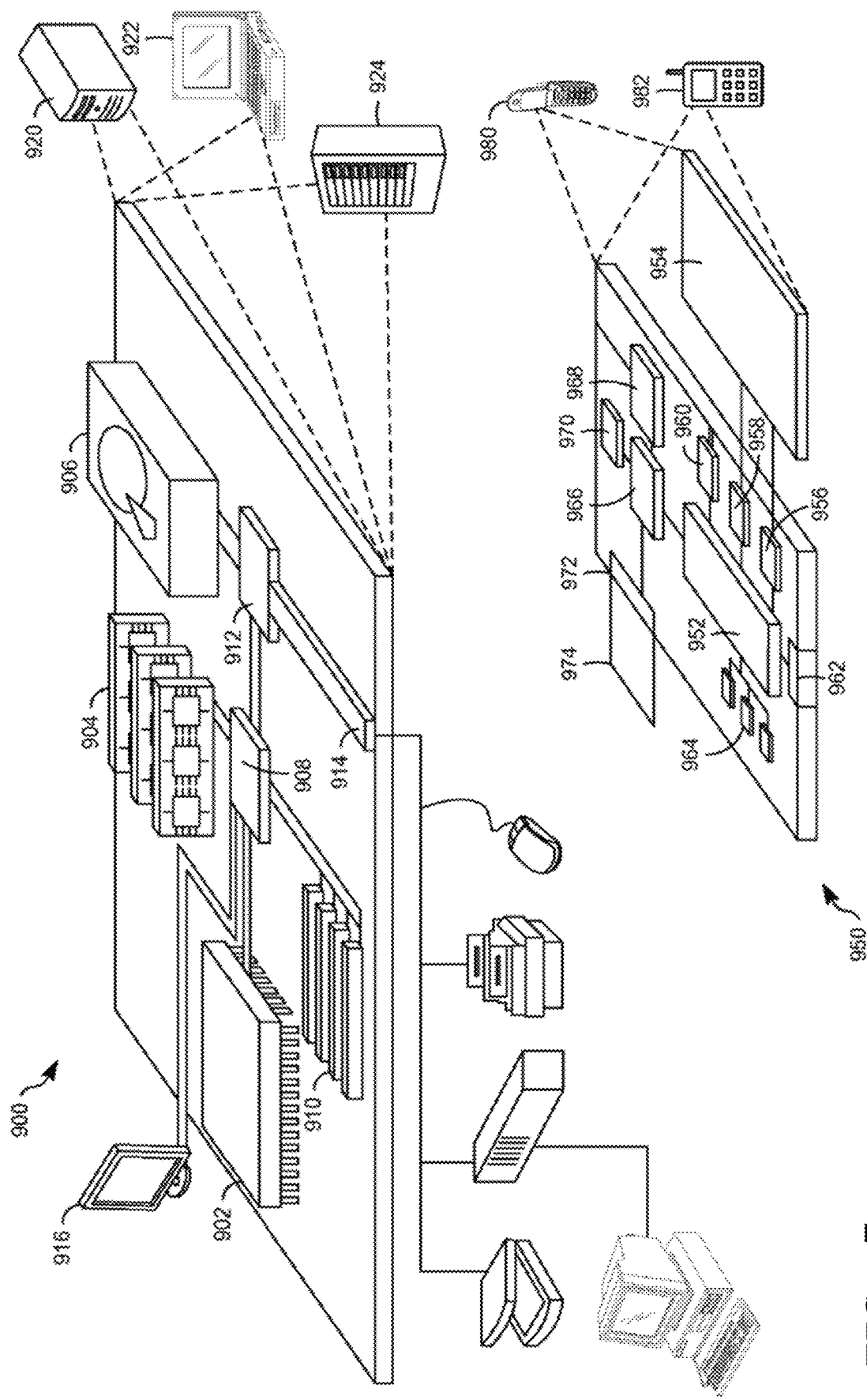
FIG. 7 is a diagram that shows an example of a generic computer device and a generic mobile computer device, which may be used with the techniques described herein.

FIG. 7 is a diagram that shows an example of a generic computer device and a generic mobile computer device, which may be used with the techniques described herein. Embodiments of the invention can be implemented in digital electronic circuitry, or in computer hardware, firmware, software, or in combinations of them. The invention can be implemented as a computer program product, for example, a computer program tangibly embodied in an information carrier, for example, in a machine-readable storage device, for execution by, or to control the operation of, data processing apparatus, for example, a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, optical disks or solid state disks. Such storage means may also provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server are generally remote from each other and typically interact through a communication network. The relationship of client and server arises by virtue of computer programs running on the respective computers and having a client-server relationship to each other.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer system configured to communicate with an industrial system, the computer system comprising:
    a data collection server configured to receive equipment data from the industrial system and to provide a data stream by pre-processing the equipment data according to a plurality of pre-determined rules;
    a first uni-directional interface configured to transmit the data stream to one or more further computer systems; and
    a second uni-directional interface configured to receive a data packet from the one or more further computer systems, the data packet comprising a control instruction that allows a modification of at least one particular rule of the plurality of the pre-determined rules,
    wherein the first uni-directional interface comprises a data diode,
    wherein the second uni-directional interface comprises at least one sensor configured to receive the data packet from a mobile data carrier in proximity of the at least one sensor over an air-gap, the mobile data carrier being communicatively coupled to the one or more further computer systems,
    wherein the second uni-directional interface is configured to receive the control instruction in a first part of the data packet,
    wherein the second uni-directional interface is configured to receive the first part of the data packet in a size limitation that corresponds to amounts of data required to identify the modification of the particular rule,
    wherein the size limitation of the first part has an equivalent limitation by the second uni-directional interface that is configured to receive the first part in a maximum size, and
    wherein the maximum size depends on a number of rule modifications in the control instruction.

2. The computer system according to claim 1,
    wherein the second uni-directional interface comprises an optical sensor configured to receive the data packet via an optical code from the mobile data carrier.

3. The computer system according to claim 1,
    wherein the second uni-directional interface comprises an acoustical sensor configured to receive the data packet via a sequence of acoustical codes from a loudspeaker of the mobile device.

4. The computer system according to claim 1, wherein the data collection server is configured to receive the control instruction in combination with a certificate that is identified in a second part of the data packet in order to authenticate the further computer system.

5. The computer system according to claim 1, wherein the data collection server is configured to pre-process the equipment data according to pre-determined rules, comprising selection rules, to provide the data stream as a sub-set of equipment data.

6. The computer system according to claim 1, wherein the data collection server is configured to pre-process the equipment data according to pre-determined rules, comprising identification rules, to provide the data stream with identifiers to allow selective data transmission to different further computer systems, or to allow selective data transmission to different applications in the one or more further computer systems.

7. A computer-implemented method for operating a computer system that forwards equipment data from an industrial system to an analysis system, the method comprising:
pre-processing equipment data from the industrial system to a data stream according to actions that are selectively activated by a plurality of predetermined rules;
transmitting the data stream to the analysis system through a first uni-directional interface of the computer system;
receiving a data packet from the analysis system, by interacting with a mobile data carrier and a second uni-directional interface that comprises at least one sensor configured to receive the data packet from a mobile data carrier in proximity of the at least one sensor over an air-gap, the mobile data carrier being communicatively coupled to the analysis system, the data packet comprising control instructions that allow modification of at least one particular rule of the plurality of pre-determined rules, the data packet having a first part that comprises the control instructions in a size that allows modifying the at least one particular rule, the receiving the data packet from the analysis system being performed by the second uni-directional interface, which second uni-directional interface is configured to receive the first part in a maximum size, with a size limitation of the first part being an equivalent limitation, the maximum size depending on a number of rule modifications in the control instructions;
pre-processing consecutive equipment data according to actions that are selectively activated by modified rules; and
transmitting a modified data stream.

8. The method according to claim 7, wherein, in the receiving step, the first part comprises the control instructions in a size that allows modifying an attribute set of the at least one particular rule.

9. The method according to claim 7, wherein the data packet has a second part with a certificate configured to allow the computer system to authenticate an origin of the data packet.

10. A computer program product that when loaded into a memory of a computer and executed by at least one processor of the computer performs steps of a computer-implemented method for operating a computer system that forwards equipment data from an industrial system to an analysis system, the method comprising:
pre-processing equipment data from the industrial system to a data stream according to actions that are selectively activated by a plurality of predetermined rules;
transmitting the data stream to the analysis system through a first uni-directional interface of the computer system;
receiving a data packet from the analysis system, by interacting with a mobile data carrier and a second uni-directional interface that comprises at least one sensor configured to receive the data packet from a mobile data carrier in proximity of the at least one sensor over an air-gap, the mobile data carrier being communicatively coupled to the analysis system, the data packet comprising control instructions that allow modification of at least one particular rule of the plurality of pre-determined rules, the data packet having a first part that comprises the control instructions in a size that allows modifying the at least one particular rule, the receiving the data packet from the analysis system being performed by the second uni-directional interface, which second uni-directional interface is configured to receive the first part in a maximum size, with a size limitation of the first part being an equivalent limitation, the maximum size depending on a number of rule modifications in the control instructions;
pre-processing consecutive equipment data according to actions that are selectively activated by modified rules; and
transmitting a modified data stream.

11. The method of claim 7, wherein:
the mobile data carrier is a mobile device, and
the at least one sensor comprises at least one of:
an optical sensor configured to receive an optical code as at least one of:
a bar-code,
a quick response (QR) code, or
a code in the form of text characters,
wherein the optical code is displayed on a screen of the mobile device or on paper;
an acoustical sensor configured to receive an acoustical code as at least one of:
a sequence of sounds, or
a spoken message from a user of the mobile device; or
a keyboard configured to receive a code in the form of alpha-numeric characters transmitted to a user visually and/or acoustically through the mobile device and transmitted without mental interaction by the user.

* * * * *